Patents United States Patent [11] 3,624,529

[72] Inventor Edward F. Gebelein, Jr.
Harwinton, Conn.
[21] Appl. No. 879,849
[22] Filed Nov. 25, 1969
[45] Patented Nov. 30, 1971
[73] Assignee Chandler Evans Inc.
West Hartford, Conn.

[54] PULSE WIDTH SIGNAL DEMODULATOR

7 Claims, 3 Drawing Figs.

[52] U.S. Cl. 329/104, 307/232, 307/234, 325/41, 325/323, 328/151, 321/106
[51] Int. Cl. H03k 9/08
[50] Field of Search 329/104, 106, 107; 307/232, 234; 328/111, 110, 109, 147, 151; 325/41, 42, 323

[56] References Cited

UNITED STATES PATENTS

| | | | |
|---|---|---|---|
| 3,049,673 | 8/1962 | Barry | 329/104 |
| 3,179,882 | 4/1965 | LeClear | 329/106 X |
| 3,386,078 | 5/1968 | Varsos | 329/104 X |
| 3,413,412 | 11/1968 | Townsend | 307/234 UX |
| 3,506,923 | 4/1970 | Ambrico et al. | 329/104 |
| 3,508,158 | 4/1970 | Marchese | 329/107 X |

*Primary Examiner*—Alfred L. Brody
*Attorney*—Fishman & Van Kirk

ABSTRACT: A demodulator circuit for providing a DC output signal which is unaffected by variations in pulse amplitude or repetition rate of a pulse width modulated input signal. The demodulator comprises switching circuitry and a pair of integrators. The switching circuitry controls the integrators whereby they function as holding generators with a short time lag; input pulses being applied alternately to the integrators which in turn provide DC output levels which are alternately measured.

INVENTOR
EDWARD F. GEBELINE, JR

BY

*FISHMAN & VAN KIRK*
ATTORNEYS

PULSE WIDTH SIGNAL DEMODULATOR

BACKGROUND OF THE INVENTION

1. Field of the Invention

The present invention relates to the demodulation of information-bearing input signals. More specifically, the present invention is directed to apparatus for extracting from a train of pulses information contained in the form of the widths of those pulses. Accordingly, the general objects of the present invention are to provide novel and improved methods and apparatus of such character.

2 . Description of the Prior Art

Demodulator circuits are, of course, well known in the art. Prior art demodulators have not, however, been capable of accurately and rapidly providing a DC output level when the information-bearing input signal was pulse width modulated and also susceptible to variations in frequency. The reasons for the foregoing may be attributed to the fact that prior art demodulation techniques called for filtering the input signal or rectifying and filtering the input signal. The prior art demodulation techniques, which relied wholly or in part upon the filtering of the input signal, could not provide an output voltage level which accurately reflected the modulation index of the input signal since the impedance of the requisite filter circuits varied with frequency in a nonlinear manner. It is also noteworthy that requirements for filtering the input signal information have imposed an undesirable limitation on the response time of prior art demodulators to changes in modulation index.

SUMMARY OF THE INVENTION

The present invention overcomes the above briefly discussed and other disadvantages of the prior art by providing a novel pulse width signal demodulator characterized by an output which varies linearly with modulation index, is insensitive to variations in input frequency and pulse amplitude and which responds to changes in modulation index without any substantial time lag. The present invention accomplishes the foregoing without reliance upon filter circuits.

In accordance with the present invention, pulse width modulated input signals are applied to a switching network. The switching network, in combination with a pair of integrators, forms a pair of sample and hold circuits. The switching network, operating under the control of a bistable circuit which is responsive to the input pulses, alternately applies signals, commensurate in duration with the input pulses, to the integrators. Further switching circuitry operating in synchronism with the sample and hold circuits alternately samples the voltages appearing at the outputs of the integrators. During periods when a first integrator is sampling and thus charging up to DC level commensurate with the input pulse width, the output of the second integrator is connected to an output terminal. The switching network further includes means for resetting the integrators immediately prior to sampling the input pulses.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
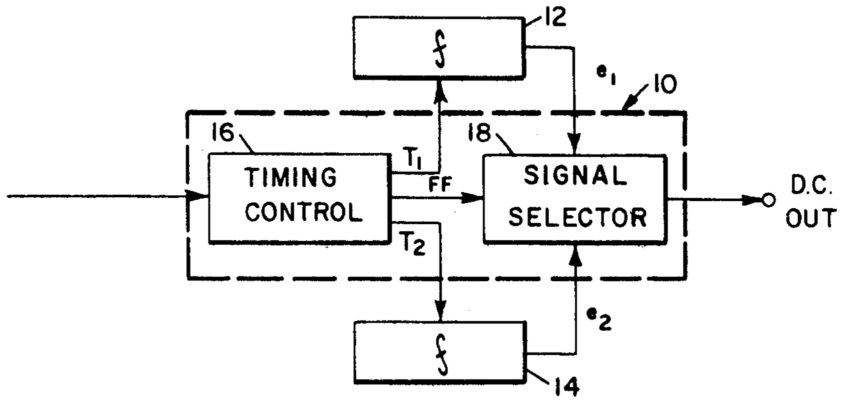
FIG. 1 is a block diagram of a preferred embodiment of the present invention.

As previously noted, the pulse width signal demodulator of the present invention comprises switching circuitry and a pair of integrators. With reference to FIG. 1, the switching circuitry is indicated generally at 10 and the integrators are depicted at 12 and 14. Switching circuitry 10 includes a timing control circuit 16 and an output signal selector circuit 18. As will become obvious from the description below, a portion of the timing control circuitry cooperates with each of the integrators to provide a pair of sample and hold circuits.

Figure 2:
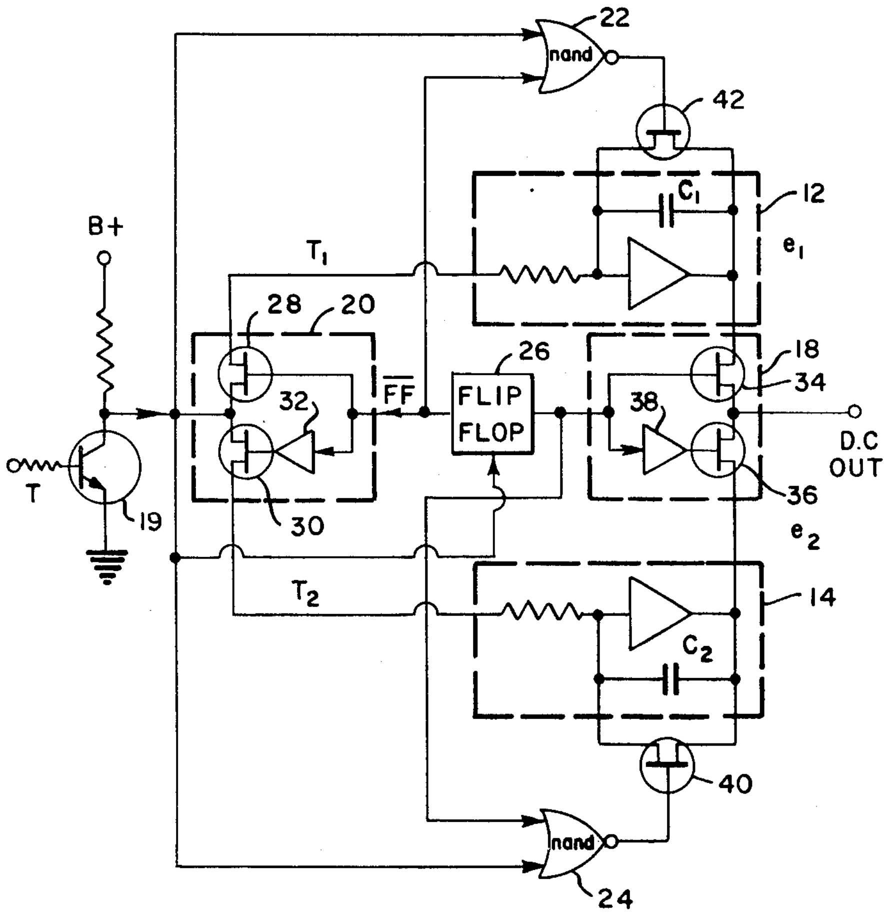
FIG. 2 depicts the embodiment of FIG. 1 in further detail.
Figure 3:
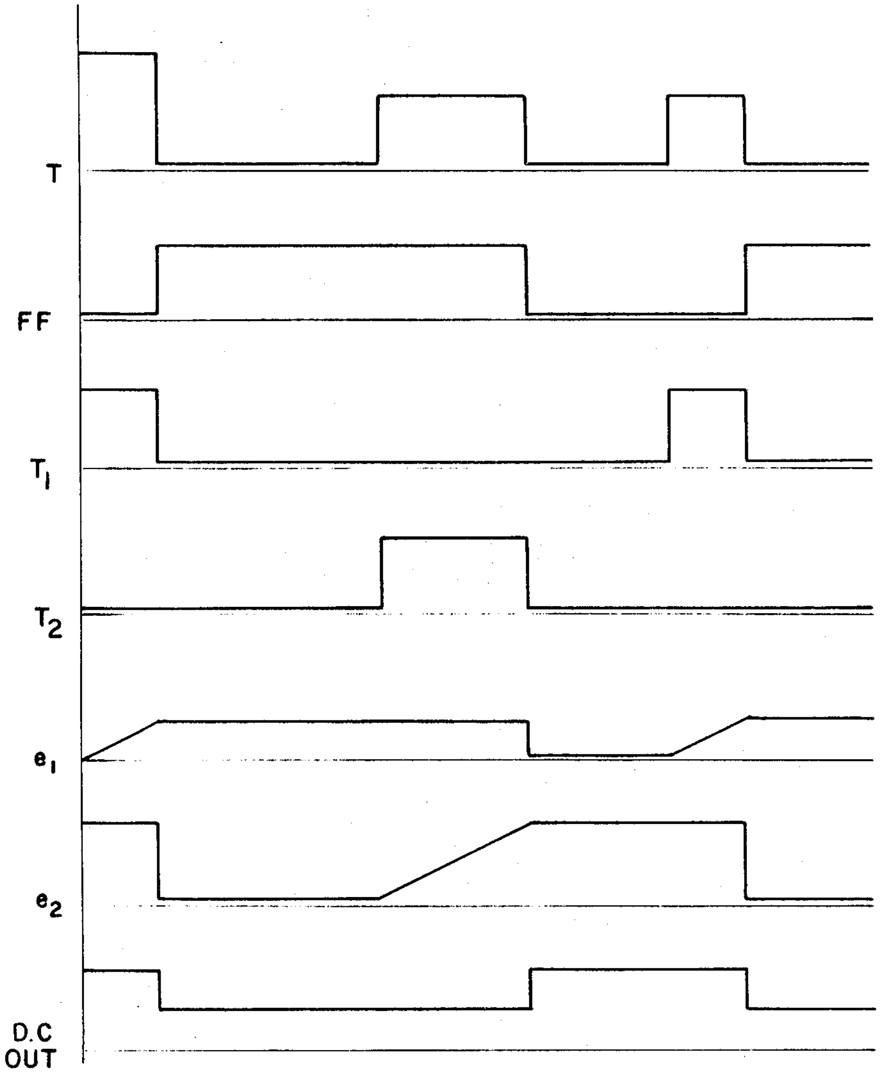
FIG. 3 is a waveform diagram depicting voltages which appear at various points in the circuitry of FIGS. 1 and 2.

As may be seen from a joint consideration of FIG. 1 and the timing diagram which constitutes FIG. 3, the pulse width modulated input signal T is applied at the input of the timing control circuit 16. Through the operation of the timing control circuit, pulses $T_1$ and $T_2$ having widths commensurate with successively received input pulses are alternately applied to respective integrators 12 and 14. The timing control circuit 16 includes means for generating switching control signals which determine to which integrator the pulse commensurate with each input pulse should be routed. A first switching control signal, indicated at FF in FIGS. 1 and 3, is also applied to signal selector 18 and determines which integrator output voltage level is to be measured. Finally, as will be described in connection with the explanation of FIG. 2, the switching control signals provided by timing control 16 cooperate with the input pulses to alternately cause clearing of integrators 12 and 14. The connection between integrators 12 and 14 and timing control 16 whereby resetting of the integrators may be achieved has been omitted from FIG. 1 in the interest of facilitating understanding of the invention but is shown in FIG. 2 and will be described below.

As noted above, pulses having a width commensurate with the input pulse width are alternately applied to integrators 12 and 14 by timing control 16. Considering the situation where both integrators are initially cleared, a first pulse $T_1$ having a width equal to that of a first received input pulse will be applied to integrator 12 and will cause the integrator to charge up to a voltage level $e_1$. Upon termination of the input pulse, timing control 16 will operate to isolate integrator 12 from the remainder of the circuit whereby voltage level $e_1$ will be held at the integrator output terminal. Simultaneously, timing control 16 will deliver a switching signal FF of proper polarity to signal selector circuit 18 whereby the output potential $e_1$ of integrator 12 will be applied to the circuit output terminal. Upon receipt of a second input pulse, a pulse $T_2$ having a width commensurate therewith will be applied to the input of integrator 14 by timing control 16. As shown in FIG. 3, the second input pulse, and thus pulse $T_2$, has a greater width than the first input pulse and thus integrator 14 will charge up to a voltage level $e_2$ which is greater than level $e_1$. Upon the termination of the second input pulse, integrator 14 will be isolated from the input circuit and signal selector circuit 18 will be switched whereby the voltage level $e_2$ which is held by integrator 14 will be applied to the circuit output terminal. Simultaneously with the switching of signal selector 18, integrator 12 will be cleared to zero and timing control 16 sequenced so that the next input pulse will be routed to integrator 12.

Through the above briefly described action, the pulsating input signal is demodulated to provide a DC output which is a pulse-by-pulse representation of the input signal. The output voltage level exhibits a time lag commensurate with a single pulse period or cycle and thus the present invention provides faster response than prior art apparatus of like character which required many cycles before the output signal reflected a change in modulation index. That is, the output voltage will immediately be stepped to a new level upon the termination of a single input pulse rather than some time thereafter; the additional time being commensurate with the filtering characteristic of prior art demodulators.

The operation of the present invention may be more clearly understood from a consideration of FIG. 2. The pulse width modulated input signal T is applied to the base of an input transistor 19. Transistor 19 functions as a clipping circuit whereby the pulses passed thereby are all of the same amplitude but are identical in width with the received input pulses. Pulses appearing at the collector of transistor 19 are simultaneously applied to a first single-pole, double-throw solid-state switch 20, pair of NAND-gates 22 and 24 and a bistable multivibrator circuit 26. Switch 20, gates 22 and 24, and flip-flop 26 all form part of timing control 16 of FIG. 1. Switch 20, may, for example, comprise an FET switch such as AMELCO-type 2126 BG available from the AMELCO Semiconductor Division of Teledyne Corporation. Switch 20 includes a pair of field effect transistors 28 and 30 and an inverting amplifier 32.

Assuming multivibrator 26 to initially be switched to the state where its FF output is positive, field effect transistor 28 of switch 20 will initially be enabled and, due to the inverter action of amplifier 32, field effect transistor 30 will be biased in the out-off region. Accordingly, the leading edge of a first input pulse will render transistor 28 conductive and a pulse $T_1$ will be applied to integrator 12. This pulse will have an amplitude commensurate with the output pulses provided by transistor 19 and a duration commensurate with the width of the input pulse. At this time, since transistor 30 is nonconductive, integrator 14 will be isolated from the input pulse train. Integrator 12 may, for example, comprise an operational amplifier and capacitor $C_1$.

Application of the $T_1$ pulse to integrator 12 will cause capacitor $C_1$ of the integrator to charge up to a voltage $e_1$. Voltage level $e_1$ varies linearly with charging time and thus linearly with input pulse width.

The trailing edge of the first input pulse will switch multivibrator 26 thereby removing the forward bias from transistor 28 and isolating integrator 12 from the input circuit. The voltage level $e_1$ to which integrator 12 has charged during the period of the first input pulse will, accordingly, be held at the integrator output. The second or FF output of multivibrator 26 will be applied to a second single-pole, double-throw FET switch 18 which may be identical to switch 20. Switch 18, which functions as the signal selector circuit, comprises a pair of field effect transistors 34 and 36 and an inverting amplifier 38. The positive FF output resulting from the switching of multivibrator 26 by the trailing edge of the first input pulse will cause transistor 34 in selector circuit 18 to be biased on and the potential $e_1$ appearing at the output of integrator 12 will accordingly be applied to the circuit output terminal.

The switching of multivibrator 26 by the trailing edge of a first input pulse, due to the operation of inverter 32, will also enable transistor 30 of switch 20 whereby the next input pulse or a clipped pulse commensurate therewith will be applied to integrator 14.

It is to be noted that the $\overline{FF}$ output of multivibrator 26 is applied as a first input to NAND-gate 24 while the FF output of multivibrator 26 is applied as a first input to NAND-gate 22. The switching of multivibrator 26 by the trailing edge of a first input pulse $T_1$ will result in the application of a positive signal to the base of a further FET switch 40 by NAND-gate 24. Thus, with no input pulse being received and multivibrator 26 switched to the condition where a positive potential appears at its FF output terminal, a positive bias will be applied to switch 40. Switch 40 will thus be turned on (closed) thereby providing a short circuit discharge path for capacitor $C_2$ in integrator 14. Integrator 14 will, accordingly, be cleared prior to receipt of a second input pulse.

The leading edge of a second input pulse will cause conduction of enabled transistor 30 of switch 20 and pulse $T_2$ will be applied to the input of integrator 14. Presuming that the second input pulse is of different width from the first input pulse, capacitor $C_2$ in integrator 14 will charge up to a second voltage level $e_2$ during the period of the second input pulse. During the time that integrator 14 is operating on pulse $T_2$, NAND-gate 24 will be disabled by the application of pulse $T_2$ directly thereto. The discharge path established by FET switch 40 will thus be interrupted.

The trailing edge of the second input pulse will switch multivibrator 26 back to its initial state and, in the manner described above with relation to the operation of integrator 12, integrator 14 will be isolated from the input circuit. The resetting of multivibrator 26 will also remove the clearing control signal from the input to NAND-gate 24 and will cause transistor 34 of signal selector 18 to cease conduction thus disconnecting the output of integrator 12 from the circuit output terminal. Simultaneously, through the action of inverter 38, transistor 36 of signal selector 18 will be rendered conductive thereby connecting the output of integrator 14 to the circuit output terminal. Accordingly, the circuit output voltage will be stepped from voltage level $e_1$ to voltage level $e_2$ simultaneously with the termination of the second input pulse which has been integrated to provide the $e_2$ potential.

Resetting of multivibrator 26 will also cause the application of a positive potential to the first input of NAND-gate 22 and, since there will be no input pulse applied to the other input of the NAND gate at this time, the positive $\overline{FF}$ signal will be applied to FET switch 42 in order to establish a discharge path for capacitor $C_1$ of integrator 12. Integrator 12 will thus be cleared so as to be able to accept a signal commensurate with a third input pulse. The positive $\overline{FF}$ signal from multivibrator 26 will also be applied to the base of transistor 28 in switching circuit 20 so as to enable this switch whereby the next input pulse will be delivered to integrator 12.

The demodulator continues to operate in the manner described above as long as it receives input pulses. Signals commensurate with each of the succeeding pulses are fed alternately to the first and second integrators so that, while one integrator is providing the effective demodulator output, the other is reset and sampling the input pulse train.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. A demodulator comprising:

first and second sample and hold circuits, said circuits having input and output terminals;

means for applying serially received input pulses alternately to said first and second sample and hold circuit input terminals;

an output terminal;

selector means for alternately connecting said output terminal to said sample and hold circuit output terminals, said selector means being connected to said applying means and operating in synchronism with said applying means to connect to said output terminal the output of the sample and hold circuit when has sampled the most recently received input pulse; and means connected to said applying means and operating in synchronism therewith for resetting said sample and hold circuits upon disconnection thereof from said output terminal by said selector means.

2. The demodulator of claim 1 wherein said sample sand hold circuits each comprise:

integrator means for providing an output potential commensurate with the duration of an applied input signal.

3. The demodulator of claim 1 wherein said applying means comprises:

first switch means for selectively applying input pulses to either of said sample and hold circuits;

means responsive to received input pulses for generating switching control signals, successively received input pulses causing said switching control signals to vary whereby said first switch means will route successive input pulses to alternate sample and hold circuits; and means applying signals provided by said generating means to said first switch means.

4. The demodulator of claim 3 wherein said sample and hold circuits each comprise:

integrator means for providing an output potential commensurate with the duration of an applied input signal.

5. The demodulator of claim 4 wherein said resetting means comprises:

second and third switch means respectively connected across said integrator means, said second and third switch means being responsive to said switching control signals for alternately short circuiting said integrator means; and means applying signals provided by said generating means to said second and third switch means.

6. The demodulator of claim 5 further comprising:

means applying the input pulses to said second and third switch means, the input pulses disabling said second and third switch means.

7. The demodulator of claim 6 wherein said selector means comprises:

fourth switch means, said fourth switch means being connected to said switching control signal-generating means and being responsive to signals provided thereby.

* * * * *

PO-1050
(5/69)

UNITED STATES PATENT OFFICE
CERTIFICATE OF CORRECTION

Patent No. 3,624,529 Dated November 11, 1971

Inventor(s) Edward F. Gebelein, Jr.

It is certified that error appears in the above-identified patent and that said Letters Patent are hereby corrected as shown below:

IN THE SPECIFICATION

Column 3, line 11, change "FF" to --$\overline{FF}$--

Column 3, line 48, change "$\overline{FF}$" to --FF--.

Column 3, line 49, change "FF" to --$\overline{FF}$--

IN THE CLAIMS

Column 4, line 49, change "when" to --which--

Signed and sealed this 9th day of May 1972.

(SEAL)
Attest:

EDWARD M.FLETCHER,JR.
Attesting Officer

ROBERT GOTTSCHALK
Commissioner of Patents